(12) United States Patent
Lin et al.

(10) Patent No.: US 9,235,093 B2
(45) Date of Patent: Jan. 12, 2016

(54) DISPLAY APPARATUS

(71) Applicant: Innolux Corporation, Miaoli County (TW)

(72) Inventors: Hsin-Hung Lin, Miaoli County (TW); Cheng-Hsu Chou, Miaoli County (TW)

(73) Assignee: INNOLUX CORPORATION, Miaoli County (TW)

( * ) Notice: Subject to any disclaimer, the term of this patent is extended or adjusted under 35 U.S.C. 154(b) by 0 days.

(21) Appl. No.: 14/463,148

(22) Filed: Aug. 19, 2014

(65) Prior Publication Data

US 2015/0070617 A1    Mar. 12, 2015

(30) Foreign Application Priority Data

Sep. 10, 2013  (TW) .............................. 102132595 U

(51) Int. Cl.
*G02F 1/136* (2006.01)
*G02F 1/1362* (2006.01)
*G02F 1/1333* (2006.01)

(52) U.S. Cl.
CPC .... *G02F 1/136286* (2013.01); *G02F 1/133345* (2013.01); *G02F 2001/13629* (2013.01)

(58) Field of Classification Search
CPC ................... G02F 1/136286; G02F 1/133345; G02F 2001/13629; G02F 1/1368; G02F 2001/136254; G02F 2001/1309; H01L 27/124; H01L 27/24

USPC ............................................ 349/43, 139, 152
See application file for complete search history.

(56) References Cited

U.S. PATENT DOCUMENTS

| | | | | |
|---|---|---|---|---|
| 5,880,794 | A * | 3/1999 | Hwang ............. | G02F 1/136286 349/38 |
| 9,116,402 | B2 * | 8/2015 | Takeda ............. | G02F 1/136286 1/1 |
| 2008/0073649 | A1 * | 3/2008 | Kim, II ................. | H01L 27/124 257/72 |

* cited by examiner

*Primary Examiner* — Vip Patel
(74) *Attorney, Agent, or Firm* — WPAT, PC; Justin King

(57) ABSTRACT

This disclosure provides a display apparatus which includes a substrate, first TFTs, scan lines and data lines connected to the first TFTs, and second TFTs for controlling inspection-use display signals; wherein each of the second TFTs includes: a first gate electrode disposed on the substrate; a first insulation layer disposed on the first gate electrode; an active unit disposed on the first insulation layer and having a source electrode electrically connected to one of the data lines, an active layer including an oxide semiconductor, and a drain electrode; a second insulation layer disposed on the active unit; and a second gate electrode disposed on the second insulation layer; wherein the first TFTs, the scan lines, and the data lines are disposed in a display area on the substrate, and the second TFTs are disposed in an area other than the display area on the substrate.

10 Claims, 9 Drawing Sheets

DISPLAY APPARATUS

This application claims the benefit of Taiwan application Serial No. 102132595, filed Sep. 10, 2013, the disclosure of which is incorporated by reference herein in its entirety.

TECHNICAL FIELD

The present disclosure relates to a display panel, and more particularly, to a display apparatus including the display panel.

TECHNICAL BACKGROUND

A liquid crystal display (LCD) panel includes two overlapping glass panels, i.e. a thin-film transistor (TFT) panel and a color filter (CF) panel. In the LCD manufacturing, after the TFT and CF panels are assembled to be a LCD panel or cell, a lighting fixture is used to inspect the basic functions of the display panel quickly and preliminarily. The lighting fixture may provide inspection-use TFTs with inspection-use signals to turn on all pixels in the display panel. The inspection-use TFTs are arranged in the edge area of the TFT panel, other than the active area in which pixel-use TFTs are arranged for image production. The inspection-use TFTs are used to control inspection-use display signals being properly provided to the pixels in the active area or display area, so that the lighting fixture can light up the LCD panel. If the LCD panel passes such a quick-inspection test, then it can be used to fabricate a LCD module. After the quick-inspection test, the gate terminals of the inspection-use TFTs have to be connected together to a DC voltage of negative value, so that the inspection-use TFTs can be disabled or turned off compulsively to avoid the electrical connections among the data lines, which may cause image failures of the display panel.

The threshold voltage $V_{th}$ of a field-effect transistor is the value of the gate-source voltage when the conducting channel just begins to connect the source and drain terminals of the transistor, allowing a significantly increasing current. However, variances in the threshold voltage $V_{th}$ of the TFTs may be induced by aging or during their manufacturing process. The threshold voltage $V_{th}$ may get smaller and smaller to be unable to turn off the TFTs at the originally specified $V_{th}$ value, causing the LCD panel to work abnormally. Therefore, it is in need to develop a new display panel to improve the reliability of the inspection-use TFTs.

TECHNICAL SUMMARY

According to one aspect of the present disclosure, one embodiment provides a display apparatus comprising a substrate, a plurality of first TFTs, a plurality of scan lines and data lines connected to the first TFTs, and a plurality of second TFTs for controlling inspection-use display signals; wherein each of the second TFTs includes: a first gate electrode disposed on the substrate; a first insulation layer disposed on the first gate electrode; an active unit disposed on the first insulation layer and having a source electrode electrically connected to one of the data lines, an active layer including an oxide semiconductor, and a drain electrode; a second insulation layer disposed on the active unit; and a second gate electrode disposed on the second insulation layer; wherein the first TFTs, the scan lines, and the data lines are disposed in a display area on the substrate, and the second TFTs are disposed in an area other than the display area on the substrate.

According to another aspect of the present disclosure, another embodiment provides a display apparatus comprising a substrate, a plurality of first TFTs, a plurality of scan lines and data lines connected to the first TFTs, and a plurality of second TFTs for controlling inspection-use display signals; wherein each of the second TFTs includes: a first gate electrode disposed on the substrate; a first insulation layer disposed on the first gate electrode; an active unit disposed on the first insulation layer and having a source electrode electrically connected to one of the data lines and the scan lines, an active layer including an oxide semiconductor, and a drain electrode; a second insulation layer disposed on the active unit; and a second gate electrode disposed on the second insulation layer; wherein the first TFTs, the scan lines, and the data lines are disposed in a display area on the substrate, the second TFTs connected to the data lines are disposed in a first area on the substrate, the second TFTs connected to the scan lines are disposed in a second area on the substrate, and one of the display area, the first area, and the second area do not overlap the other one.

In one embodiment, the second gate electrode is electrically connected to the first gate electrode.

In one embodiment, the second gate electrode is electrically connected to an inspection-use gate electrode.

In one embodiment, the first gate electrodes of a part of the second TFTs are electrically connected to each other.

In one embodiment, the drain electrodes of a part of the second TFTs are electrically connected to each other.

In one embodiment, the source electrode and the drain electrode are disposed on the active layer and the source and drain electrodes are separated by a separation space, and the active layer is disposed on the source electrode and the drain electrode and fills the separation space; wherein the separation space may include a first part and a second part on the first part, the first part has a width larger than that of the second part, and a third insulation layer fills up the first part while the second insulation layer fills up the second part.

In one embodiment, the source and drain electrodes are separated by a separation space, and the active layer is disposed on the source electrode and the drain electrode and fills the separation space.

In one embodiment, a third insulation layer with a first opening and a second opening spaced from the first opening is disposed on the active layer, and the source electrode and the drain electrode fill the first opening and the second opening, respectively.

In one embodiment, the oxide semiconductor comprises a material selected from the group consisting of indium gallium zinc oxide (IGZO), indium tin zinc oxide (ITZO), indium gallium oxide (IGO), zinc oxide (ZnO), and tin oxide (SnO).

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For further understanding and recognizing the fulfilled functions and structural characteristics of the disclosure, several exemplary embodiments cooperating with detailed description are presented as the following. Reference will now be made in detail to the preferred embodiments, examples of which are illustrated in the accompanying drawings.

In the following description of the embodiments, it is to be understood that when an element such as a layer (film), region, pattern, or structure is stated as being "on" or "under" another element, it can be "directly" on or under another element or can be "indirectly" formed such that an intervening element is also present. Also, the terms such as "on" or "under" should be understood on the basis of the drawings, and they may be used herein to represent the relationship of one element to another element as illustrated in the figures. It will be understood that this expression is intended to encompass different orientations of the elements in addition to the orientation depicted in the figures, namely, to encompass both "on" and "under". In addition, although the terms "first", "second" and "third" are used to describe various elements, these elements should not be limited by the term. Also, unless otherwise defined, all terms are intended to have the same meaning as commonly understood by one of ordinary skill in the art.

Figure 1:
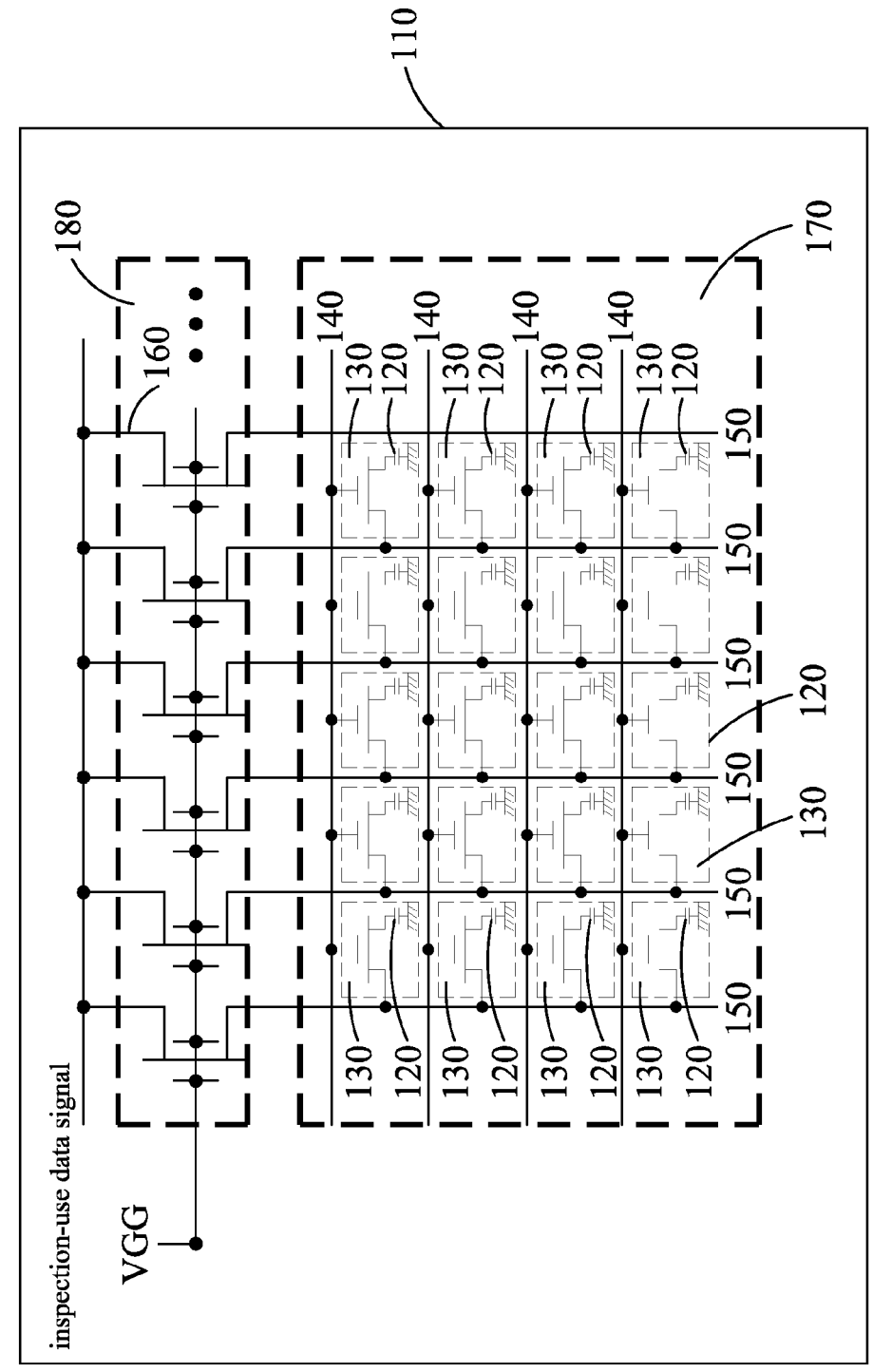
FIG. 1 shows a plan view of a display apparatus according to one embodiment of the present disclosure.

FIG. 1 schematically shows a plan view of a display apparatus 100 according to one embodiment of the present disclosure. The display apparatus 100 includes: a substrate 110, a plurality of pixels having a pixel electrode 120, a plurality of first TFTs 130, a plurality of scan lines 140 and data lines 150, and a plurality of second TFTs 160. The pixel electrodes 120, the first TFTs 130, the scan lines 140, and the data lines 150 are disposed in a display area 170 on the substrate 110, where the display apparatus 100 can produce images by controlling the pixels therein. The second TFTs 160 are disposed in an first area 180, which is an area other than the display area 170 on the substrate 110, so as to control inspection-use display signals being properly provided to the pixels in the display area 170. Such an operation can be referred to as "quick inspection" in the display industry terminology, which is performed in order to determine the performance of the display apparatus 100 preliminarily and to prevent materials and operations from being wasted in the subsequent process. In the manufacturing process of display panel, the first TFTs 130 may be referred to as "pixel-use TFT" and the second TFTs 160 may be referred to as "inspection-use TFT".

The substrate 110 is used to support the pixel electrodes 120, the first TFTs 130, the scan lines 140, the data lines 150, and the second TFTs 160. The substrate 110 may be made of flexible or rigid material, either transparent or opaque. In this embodiment, the substrate 110 is formed of glass. Since the first TFTs 130 and the second TFTs 160 are to be formed on the substrate 110, the substrate 110 can be referred to as "TFT panel" in the display industry terminology.

In the display apparatus 100, the pixels are arranged in a matrix form on the substrate 110. For a color display, each pixel can be divided into red, green and blue sub-pixels. As shown in FIG. 1, the scan lines 140 are horizontal wires configured for delivering the scanning signals from a scan driver (not shown) to drive the TFTs 130 in sequence. The data lines 150 are vertical wires configured for delivering the display data signals from a data driver (not shown) to drive the pixels. The data driver provides electric potentials corresponding to the pixels, so as to drive the data lines 150. Each pixel can be defined at the intersection of each scan line 140 and each data line 150. The gate terminal of each first TFT 130 is connected to one of the scan lines 140, and its drain terminal is connected to one of the data line 150. The pixel can be switched on or off according to the scanning signal, the data signal and the voltage level of its pixel electrode.

The second TFTs 160, acting as the inspection-use TFTs, are disposed in a first area 180, which is an area other than the display area 170 on the substrate 110, so as to control the inspection-use display signals being properly provided to the display area 170. The gate electrodes of the second TFTs 160 are electrically connected to each other, and the drain electrodes of the second TFTs 160 are electrically connected to each other, too. Some examples are described in the following. If the second TFTs 160 are numbered in sequence from left to right side, the gate electrodes of the even-numbered (i.e., 2, 4, 6 . . . ) second TFTs 160, the odd-numbered (i.e., 1, 3, 5 . . . ) second TFTs 160, every other two (i.e., 1, 4, 7 . . . or 2, 5, 8 . . . ) second TFTs 160, or all of the second TFTs 160 can be connected together. Also, the drain electrodes of the even-numbered second TFTs 160, the odd-numbered second TFTs 160, every other two (i.e., 1, 4, 7 . . . or 2, 5, 8 . . . ) second TFTs 160, every other two (i.e., 1, 4, 7 . . . or 2, 5, 8 . . . ) second TFTs 160, every other two (i.e., 1, 4, 7 . . . or 2, 5, 8 . . . ) second TFTs 160, or all of the second TFTs 160 can be connected together. Considering one of the second TFTs 160, its source electrode is connected to one of the data lines 150, and the connection conditions of its drain electrode and gate electrode depend on the manufacturing process. In the LCD manufacturing, after a TFT panel and a CF panel are assembled to be a display panel, a lighting fixture is used to inspect the basic functions of the display panel quickly and preliminarily. The lighting fixture may provide the drain terminals and gate terminals of the second TFTs 160 with inspection-use signals to turn on all pixels in the display panel. For example, an inspection-use gate signal VGG voltage can be applied to the gate terminals of the second TFTs 160, and an inspection-use data signal can be applied to the drain terminals of the second TFTs 160. If the display panel does not fail in the above inspection test, then it can be used to fabricate a display module. All the gate terminals of the second TFTs 160 (the inspection-use TFTs) have to be connected together to a DC voltage of negative value, so that the inspection-use TFTs can be disabled or turned off compulsively to avoid the electrical connections among the data lines, which may cause image failures of the display panel.

The threshold voltage $V_{th}$ of a field-effect transistor is the value of the gate-source voltage when the conducting channel just begins to connect the source and drain terminals of the transistor, allowing a significantly increasing current. Variances in the threshold voltage $V_{th}$ of the second TFTs 160 may be induced by aging or during their manufacturing process. The threshold voltage $V_{th}$ may get smaller and smaller to be unable to turn off the second TFTs 160 at the originally specified $V_{th}$ value, causing the display apparatus to work abnormally. To improve the reliability of the second TFTs 160, four device structures are presented for the second TFTs 160 according to the current disclosure.

Figure 2:
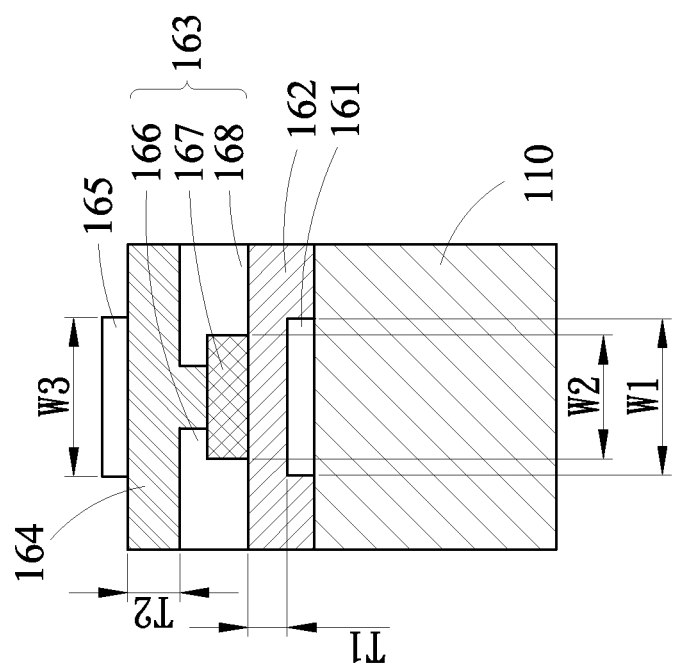
FIG. 2 shows a cross-sectional view of the second TFT according to a first embodiment of the present disclosure.

FIG. 2 shows a cross-sectional view of the second TFT 160 according to a first embodiment of the present disclosure. The second TFT 160 includes a first gate electrode 161 disposed on the substrate 110, a first insulation layer 162 disposed on the first gate electrode 161, an active unit 163 disposed on the first insulation layer 162, a second insulation layer 164 disposed on the active unit 163, and a second gate electrode 165 disposed on the second insulation layer 164. The first gate electrode 161 and the second gate electrode 165 may act as the bottom and top electrodes of the second TFT 160, respectively. The second gate electrode 165 may be electrically connected to the first gate electrode 161 or an inspection-use gate electrode, so as to receive a DC voltage VGG of negative value to turn off the second TFT 160, as shown in FIG. 1.

By using the photolithography and a proper (dry or wet) etching method, the first gate electrode 161 can be patterned to have a width W1. The first insulation layer 162 is deposited on the first gate electrode 161 with a thickness T1. The thickness T1 is about 0.2 to 0.5 μm and dependent on practical requirements, but it is not limited thereto. As shown in FIG. 2, the active unit 163 includes a source electrode 166, an active layer 167, and a drain electrode 168, in which the active layer 167 is disposed on the first insulation layer 162 and patterned to have a width W2, by using the photolithography and a proper etching method. The active layer 167 may be made of an oxide semiconductor material, e.g. indium gallium zinc oxide (IGZO), indium tin zinc oxide (ITZO), indium gallium oxide (IGO), zinc oxide (ZnO), and tin oxide (SnO), with a high mobility of charge carrier. Thus, the second TFT 160 can be referred to as "oxide TFT". In the embodiment, IGZO is selected as the composition of the active layer 167.

The active layer 167 and the first gate electrode 161 overlap, and the active layer 167 and the first gate electrode 161 are symmetrical at the same axis of symmetry. The width W1 of the first gate electrode 161 may be larger than the width W2 of the active layer 167, so that the electric field generated by the gate voltage at the first gate electrode 161 can applied to the active layer 167 effectively. The sizes (e.g. W1 and W2) and locations of the first gate electrode 161 and the active layer 167 may depend on practical requirements. The source electrode 166 and the active layer 167 overlap in part, and the source electrode 166 is located at the left side of the active layer 167. The drain electrode 168 and the active layer 167 overlap in part, and the drain electrode 168 is located at the right side of the active layer 167. The source and drain electrodes 166 and 168 are used to form the source and drain terminals of the second TFT 160. Moreover, by using the photolithography and a proper etching method, the source and drain electrodes 166 and 168 are separated by a separation space. The conducting channel of the second TFT 160 can be disposed in a region adjoining the first insulation layer 162 in the active layer 167. The second insulation layer 164 is then disposed on the active unit 163, filling the above-mentioned separation space.

Next, the second gate electrode 165 can be disposed on the second insulation layer 164. By using the photolithography and a proper etching method, the second gate electrode 165 can be patterned to have a width W3. The second gate electrode 165 and the first gate electrode 161 overlap, and the first gate electrode 161, the active layer 167 and the second gate electrode 165 are symmetrical at the same axis of symmetry. The width W3 of the second gate electrode 165 may be larger than or equal to the width W1 of the first gate electrode 161; but it is not limited thereto, the size and location of the second gate electrode 165 may depend on practical requirements. The second gate electrode 165 is electrically connected to the first gate electrode 161, so that the second TFT 160 is equipped with dual gate electrodes, i.e. the first and second gate electrode 161 and 165, overlapping vertically. The gate signal of negative DC voltage can be applied to the dual gate electrodes 161 and 165, so that the electric fields generated by the gate voltage at both the first gate electrode 161 and the second gate electrode 165 can applied to the active layer 167 concurrently, so as to prevent the threshold voltage $V_{th}$ of the second TFT 160 from getting smaller.

Figure 3A:
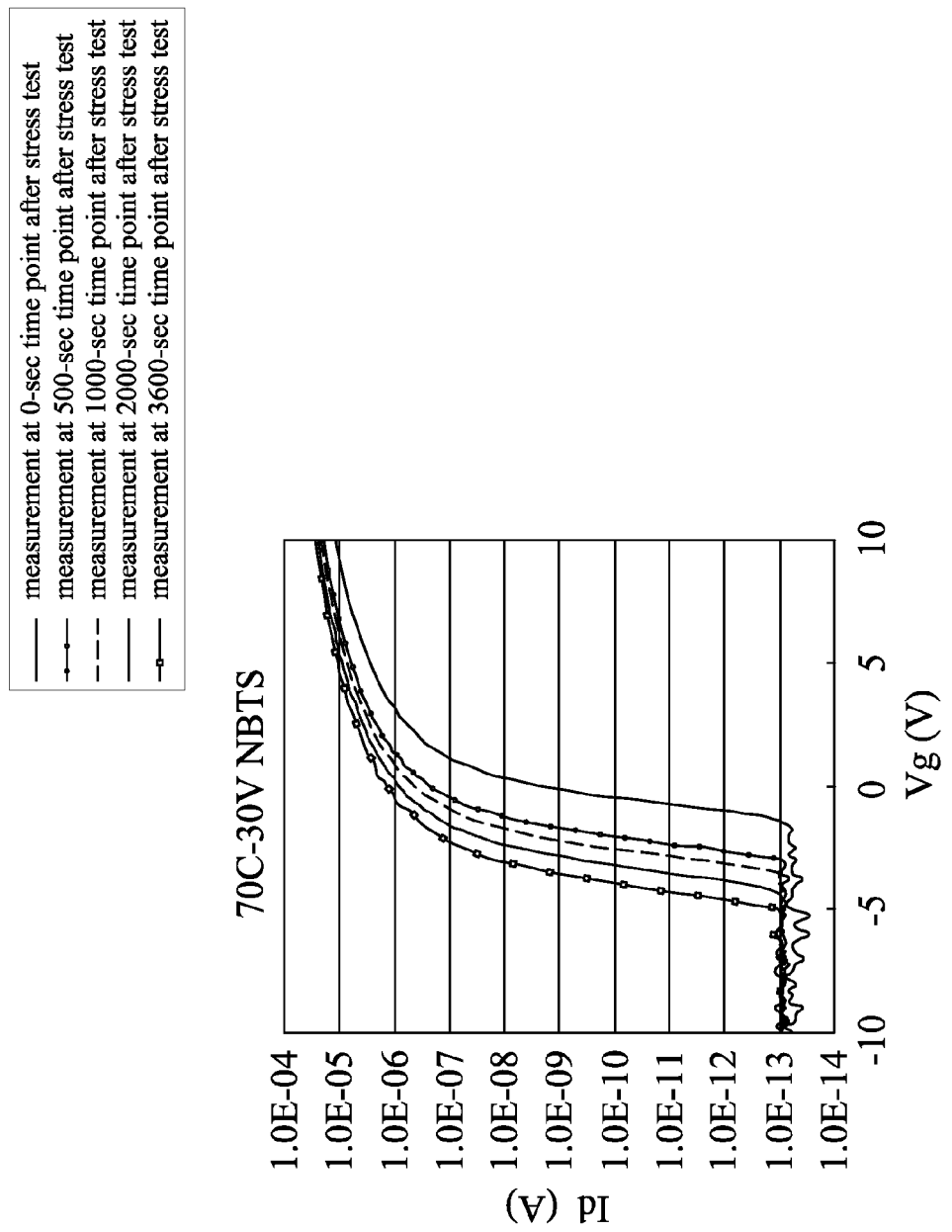
FIG. 3A is the measurement result of the TFT with only a bottom gate electrode after the stress test.
Figure 3B:
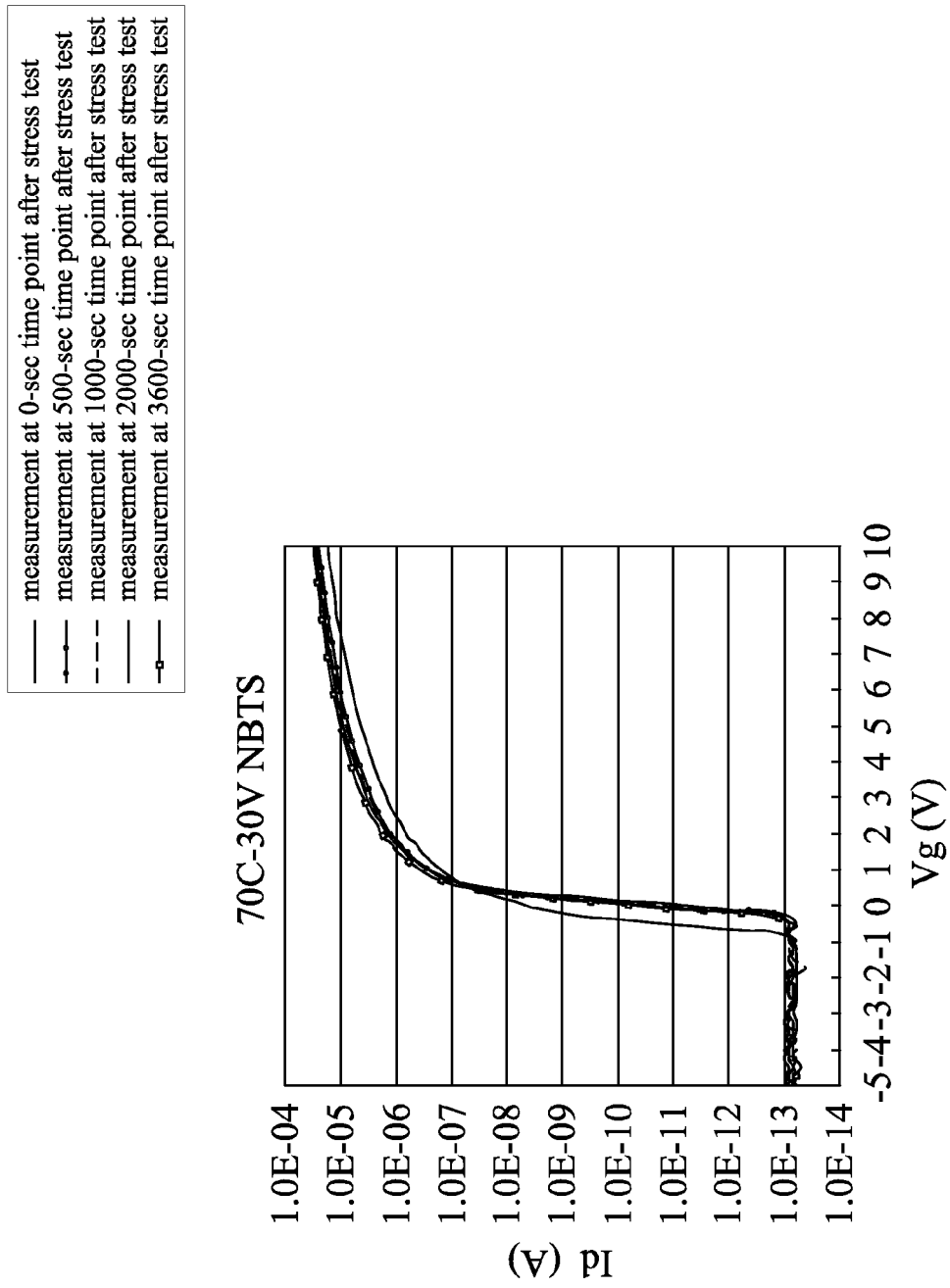
FIG. 3B is the measurement result of the TFT with dual gate electrodes after the stress test.

To understand the performance of the above-mentioned dual gate electrodes, two types of TFTs have been fabricated. TFT A is the TFT with dual gate electrodes according to the embodiment of FIG. 2, and TFT B is the TFT with only a bottom gate electrode. During the reliability stress test, DC voltages of 0, 0, and −30 volts have been respectively applied to the source, drain, and gate terminals of TFTs A and B at a temperature of 70° C. for one hour. After that, DC voltages of 0 and 10 volts have been respectively applied to the source and drain terminals of TFTs A and B at a temperature of 70° C., and an increasing DC voltage (the gate voltage $V_g$) from −10 to 10 volts has been applied to the gate terminal. The drain current ($I_d$) was measured at the time points of 0, 500, 1000, 2000, and 3600 seconds after the stress test. The measurement result, e.g. the characteristic curve of $I_d$ versus $V_g$, for TFT B is shown in FIG. 3A, in which the threshold voltage $V_{th}$ is decreased by 3.47 volts from the time point of 0 second to the time point of 3600 seconds after the stress test. On the other respect, the characteristic curve of $I_d$ versus $V_g$ for TFT A is shown in FIG. 3B, in which the threshold voltage $V_{th}$ is increased by 0.27 volts from the measurement at the 0-second time point to that at the 3600-second time point after the stress test. This indicates that the dual gate electrodes in the TFT of the embodiment can effectively prevent the threshold voltage $V_{th}$ of the second TFT 160 from getting smaller or the characteristic curve ($I_d$ versus $V_g$) from shifting leftward.

Figure 4:
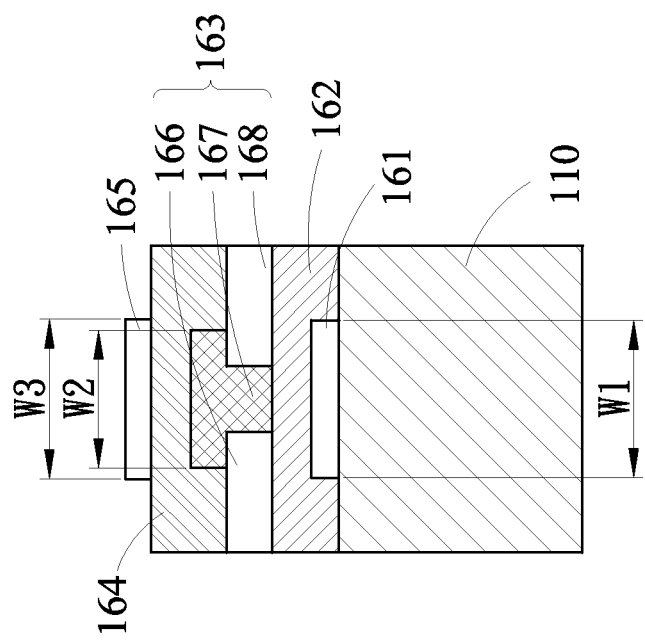
FIG. 4 shows a cross-sectional view of the second TFT according to a second embodiment of the present disclosure.

FIG. 4 shows a cross-sectional view of the second TFT 160 according to a second embodiment of the present disclosure. The second TFT 160 includes a first gate electrode 161, a first insulation layer 162, an active unit 163 having a source electrode 166, an active layer 167 and a drain electrode 168, a second insulation layer 164, and a second gate electrode 165. The structure of the active unit 163 is different from that in FIG. 2 according the first embodiment and will be described in detail in the following paragraphs. Except that, the TFT of the present embodiment has similar composition and structure to that of the first embodiment, and the redundancies will not be described again.

As shown in FIG. 4, an electrode layer can be disposed on the first insulation layer 162 by using a proper deposition method, and the electrode layer can be patterned, by using the photolithography and a proper etching method, to form the source and drain electrodes 166 and 168 and a separation space between the source and drain electrodes 166 and 168. Next, the active layer 167 is deposited on the source and drain electrodes 166 and 168 and fills the separation space. Thus, the conducting channel of the second TFT 160 can be disposed in a region adjoining the first insulation layer 162 in the active layer 167. The active layer 167 can be patterned to have a width W2, by using the photolithography and a proper etching method. The first gate electrode 161, the active layer 167, and the second gate electrode 165 overlap, and the first gate electrode 161, the active layer 167 and the second gate electrode 165 are symmetrical at the same axis of symmetry. Each of the width W3 of the second gate electrode 165 and the width W1 of the first gate electrode 161 may be larger than the width W2 of the active layer 167; but it is not limited thereto, the sizes (e.g. W1, W2 and W3) and locations of the first gate electrode 161, the active layer 167 and the second gate electrode 165 may depend on practical requirements. The second gate electrode 165 is electrically connected to the first gate electrode 161, so that the second TFT 160 is equipped with dual gate electrodes, i.e. the first and second gate electrode 161 and 165, overlapping vertically. The gate signal of negative-value DC voltage can be applied to the dual gate electrodes 161 and 165, so that the electric fields generated by the gate voltage at both the first gate electrode 161 and the second gate electrode 165 can applied to the active layer 167 concurrently, so as to prevent the threshold voltage $V_{th}$ of the second TFT 160 from getting smaller or the characteristic curve ($I_d$ versus $V_g$) from shifting leftward.

Figure 5:
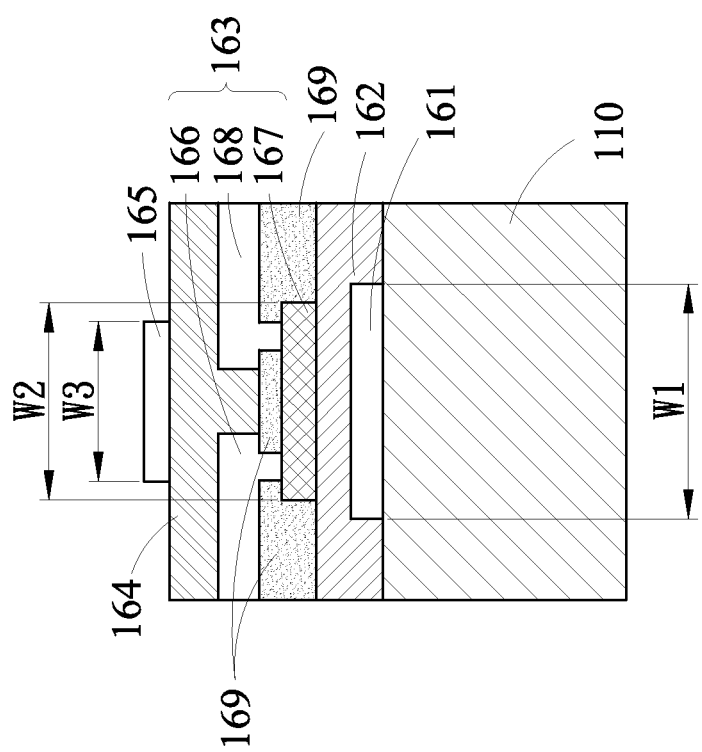
FIG. 5 shows a cross-sectional view of the second TFT according to a third embodiment of the present disclosure.

FIG. 5 shows a cross-sectional view of the second TFT 160 according to a third embodiment of the present disclosure. The second TFT 160 includes a first gate electrode 161, a first insulation layer 162, an active unit 163 having a source electrode 166, an active layer 167 and a drain electrode 168, a second insulation layer 164, and a second gate electrode 165. The structure of the active unit 163 is different from that in FIG. 2 according the first embodiment and will be described in detail in the following paragraphs. Except that, the TFT of the present embodiment has similar composition and structure to that of the first embodiment, and the redundancies will not be described again.

As shown in FIG. 5, the active layer 167 is disposed on the first insulation layer 162, and then patterned to have a width W2, by using the photolithography and a proper etching method. Then, a third insulation layer 169 can be deposited on the active layer 167, and first and second openings can be patterned in the third insulation layer 169, by using the photolithography and a proper etching method. The first opening acts as a contact window between the active layer 167 and the source electrode 166, while the second opening acts as a contact window between the active layer 167 and the drain electrode 168. The first opening is spaced from the second opening. The part of the third insulation layer 169 between the first and second openings is reserved to separate the source and drain electrodes 166 and 168 in the subsequent process. Next, an electrode layer is deposited on the third insulation layer 169 and fills the first and second openings, by using a proper deposition method. A separation space is disposed between the source and drain electrodes 166 and 168, and the second insulation layer 164 is deposited on the source and drain electrodes 166 and 168 and fills the separation space, by using a proper deposition method. Thus, the conducting channel of the second TFT 160 can be disposed in a region adjoining the first insulation layer 162 in the active layer 167.

The first gate electrode 161, the active layer 167, and the second gate electrode 165 overlap, and the first gate electrode 161, the active layer 167 and the second gate electrode 165 are symmetrical at the same axis of symmetry. The width W1 of the first gate electrode 161 may be larger than the width W2 of the active layer 167, and the width W3 of the second gate electrode 165 may be larger than the width W2 of the active layer 167; but it is not limited thereto, the sizes (e.g. W1, W2, W3) and locations of the first gate electrode 161, the active layer 167 and the second gate electrode 165 may depend on practical requirements. The second gate electrode 165 is electrically connected to the first gate electrode 161, so that the second TFT 160 is equipped with dual gate electrodes, i.e. the first and second gate electrode 161 and 165, overlapping vertically. The gate signal of negative-value DC voltage can be applied to the dual gate electrodes 161 and 165, so that the electric fields generated by the gate voltage at both the first gate electrode 161 and the second gate electrode 165 can applied to the active layer 167 concurrently, so as to prevent the threshold voltage $V_{th}$ of the second TFT 160 from getting smaller or the characteristic curve ($I_d$ versus $V_g$) from shifting leftward.

Figure 6:
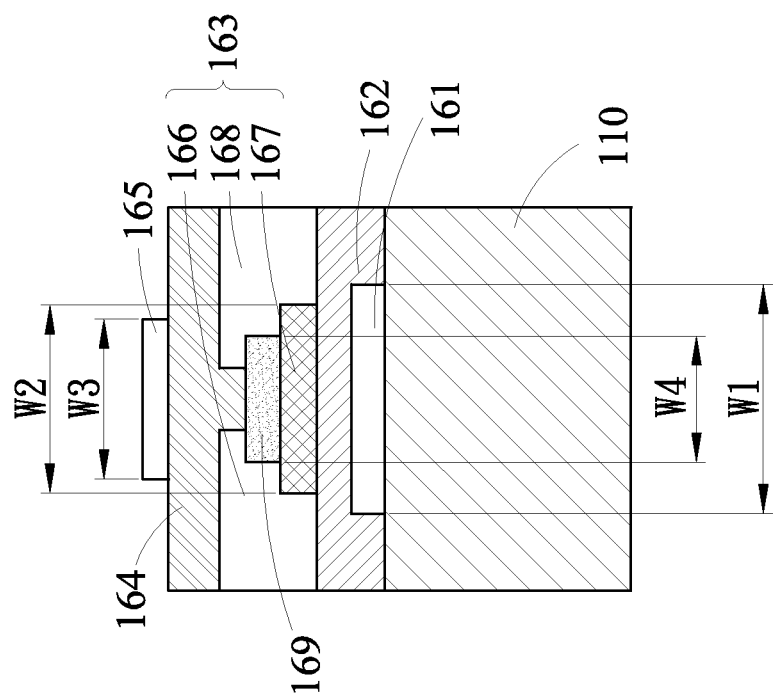
FIG. 6 shows a cross-sectional view of the second TFT according to a fourth embodiment of the present disclosure.

FIG. 6 shows a cross-sectional view of the second TFT 160 according to a fourth embodiment of the present disclosure. The second TFT 160 includes a first gate electrode 161, a first insulation layer 162, an active unit 163 including a source electrode 166, an active layer 167 and a drain electrode 168, a second insulation layer 164, and a second gate electrode 165. The structure of the active unit 163 is different from that in FIG. 2 according the first embodiment and will be described in detail in the following paragraphs. Except that, the TFT of the present embodiment has similar composition and structure to that of the first embodiment, and the redundancies will not be described again.

As shown in FIG. 6, the active layer 167 is disposed on the first insulation layer 162, and then patterned to have a width W2, by using the photolithography and a proper etching method. Then, a third insulation layer 169 can be deposited on the active layer 167, and then patterned to have a width W4, by using the photolithography and a proper etching method. Next, an electrode layer is deposited on the third insulation layer 169, the active layer 167, and the first insulation layer 162 to form the source and drain electrodes 166 and 168. Then, a separation space is disposed between the source and drain electrodes 166 and 168 in the electrode layer, by using the photolithography and a proper etching method. Next, the second insulation layer 164 is disposed on the source electrode 166, the third insulation layer 169, and the drain electrode 168 and fills the separation space. That is to say, the source electrode 166 and the drain electrode 168 are separated by both the third insulation layer 169 on the active layer 167 and the second insulation layer at the separation space. Thus, the conducting channel of the second TFT 160 can be disposed in a region adjoining the first insulation layer 162 in the active layer 167.

The first gate electrode 161, the active layer 167, the third insulation layer 169 and the second gate electrode 165 overlap, and the first gate electrode 161, the active layer 167, the third insulation layer 169 and the second gate electrode 165 are symmetrical at the same axis of symmetry. The width W1 of the first gate electrode 161 may be larger than the width W2 of the active layer 167, the width W2 of the active layer 167 may be larger than the width W4 of the third insulation layer 169, and the width W3 of the second gate electrode 165 may be larger than the width W2 of the active layer 167; but it is not limited thereto, the sizes (e.g. W1, W2, W3, W4) and locations of the first gate electrode 161, the active layer 167, the third insulation layer 169 and the second gate electrode 165 may depend on practical requirements. The second gate electrode 165 is electrically connected to the first gate electrode 161, so that the second TFT 160 is equipped with dual gate electrodes, i.e. the first and second gate electrode 161 and 165, overlapping vertically. The gate signal of negative-value DC voltage can be applied to the dual gate electrodes 161 and 165, so that the electric fields generated by the gate voltage at both the first gate electrode 161 and the second gate electrode 165 can applied to the active layer 167 concurrently, so as to prevent the threshold voltage $V_{th}$ of the second TFT 160 from getting smaller or the characteristic curve ($I_d$ versus $V_g$) from shifting leftward.

Figure 7:
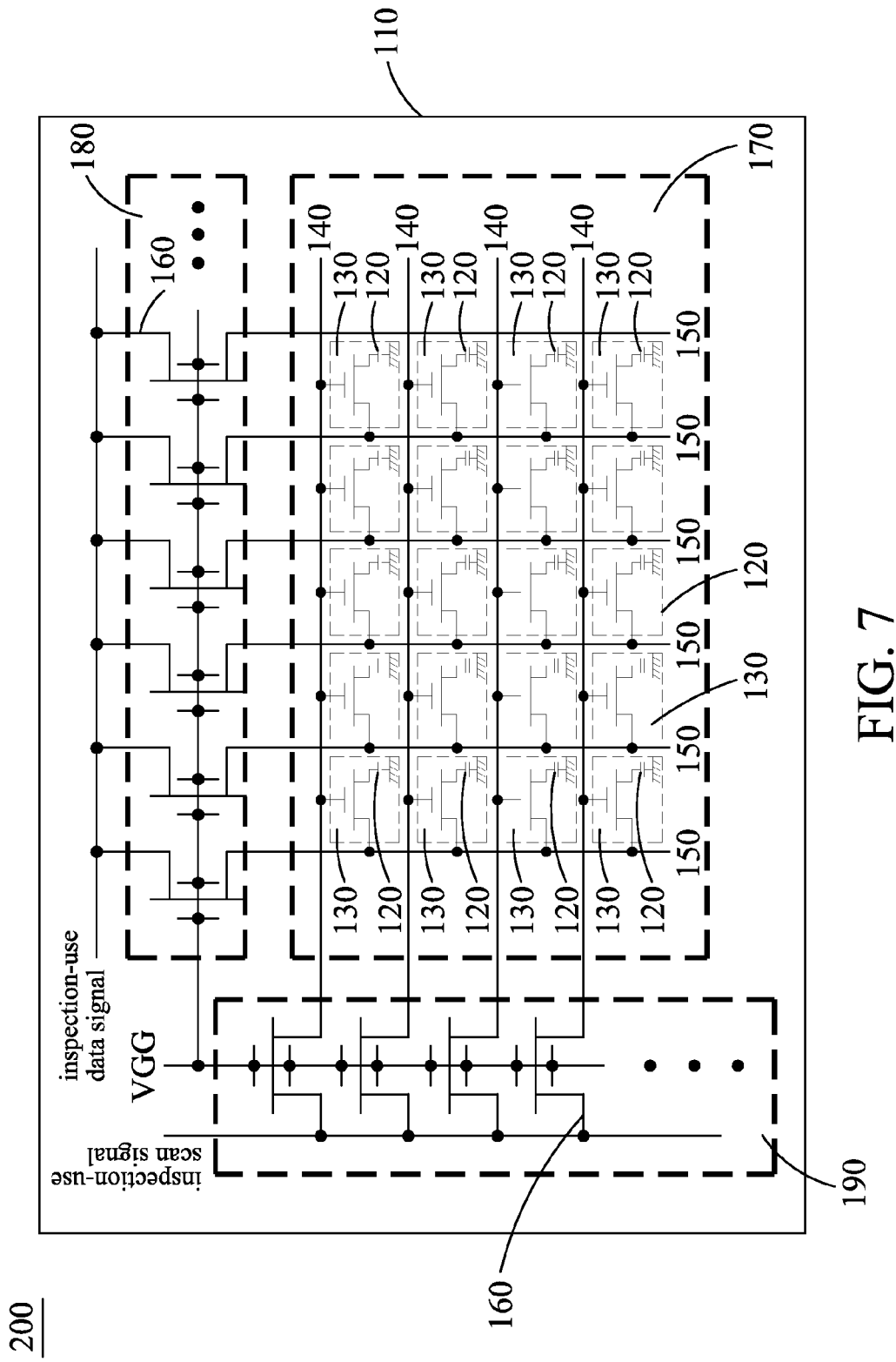
FIG. 7 shows a plan view of a display apparatus according to another embodiment of the present disclosure.

Moreover, FIG. 7 schematically shows a plan view of a display apparatus 200 according to another embodiment of the present disclosure. The display apparatus 200 includes: a substrate 110, a plurality of pixels having a pixel electrode 120, a plurality of first TFTs 130, a plurality of scan lines 140 and data lines 150, and a plurality of second TFTs 160. Compared with the display apparatus 100 according to the embodiment of FIG. 1, the second TFTs 160 can further be disposed in a second area 190, which is an area other than the display area 170 and the first area 180 on the substrate 110. The second TFTs 160 in both the first area 180 and the second area 190 are used to control inspection-use display signals being properly provided to the display area 170. As shown in FIG. 7, the source terminals of some of the second TFTs 160 are connected to the data lines 150 and the source terminals of some of the other second TFTs 160 are connected to the scan lines 140. Except the above differences, the display apparatus 200 of the present embodiment is similar to the display apparatus 100 of the embodiment in FIG. 1, and the redundancies will not be described again. The second TFTs 160 in the first area 180 can be referred to as "data side" inspection-use TFTs, and those in the second area 190 can be referred to as "gate side" inspection-use TFTs in the display industry terminology.

Figure 8:
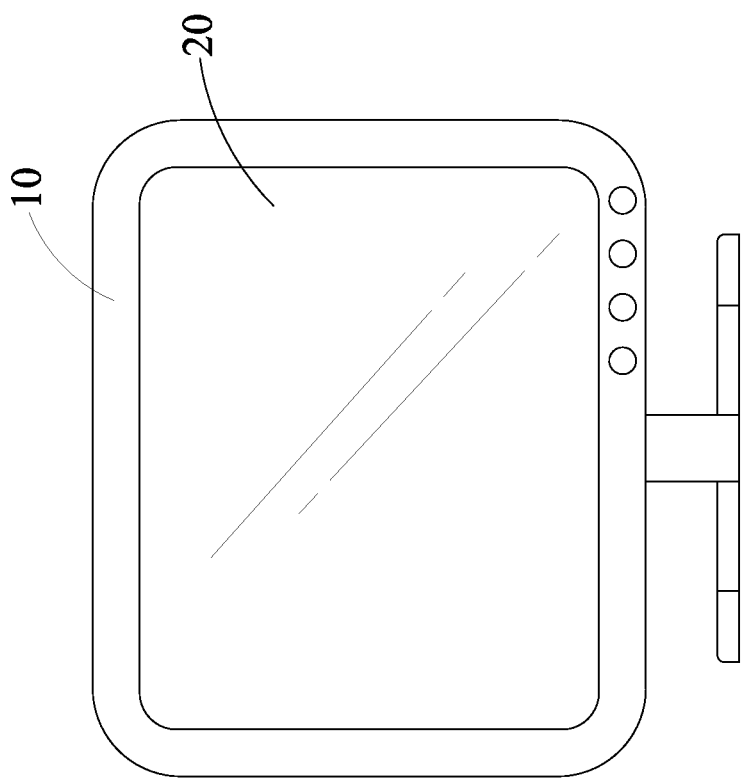
FIG. 8 shows a display apparatus according to an embodiment of this disclosure.

FIG. 8 schematically shows a display apparatus 10 according to an embodiment of this disclosure. The display apparatus 10 includes a display panel 20 according to the above-recited embodiments. The display apparatus 10 can be a calculator with a monitoring screen, a mobile phone, a tablet computer, or a digital media frame with a controller integrated-circuit chip on a printed circuit board, but this disclosure is not limited thereto. The display panel 20 can be a liquid crystal (LC) display panel with a LC layer inside. LC is matter in a state that has properties between those of conventional liquid and those of solid crystal. LCs may be composed of crystal-like organic molecules, which can be orientated according to external electrical fields. Furthermore, the display panel 20 can be an organic light-emitting diode (OLED) display apparatus.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A display apparatus comprising a substrate, a plurality of first thin-film transistors (TFTs), a plurality of scan lines and data lines connected to the first TFTs, and a plurality of second TFTs for controlling inspection-use display signals, each of the second TFTs including:
   a first gate electrode disposed on the substrate;
   a first insulation layer disposed on the first gate electrode;
   an active unit disposed on the first insulation layer and having a source electrode electrically connected to one of the data lines, an active layer including an oxide semiconductor, and a drain electrode;
   a second insulation layer disposed on the active unit; and
   a second gate electrode disposed on the second insulation layer;
   wherein the first TFTs, the scan lines, and the data lines are disposed in a display area on the substrate, and the second TFTs are disposed in an area other than the display area on the substrate.

2. The display apparatus according to claim 1, wherein the second gate electrode is electrically connected to the first gate electrode.

3. The display apparatus according to claim 1, wherein the second gate electrode is electrically connected to an inspection-use gate electrode.

4. The display apparatus according to claim 1, wherein the first gate electrodes of a part of the second TFTs are electrically connected to each other.

5. The display apparatus according to claim 1, wherein the drain electrodes of a part of the second TFTs are electrically connected to each other.

6. The display apparatus according to claim 1, wherein the source electrode and the drain electrode are disposed on the active layer.

7. The display apparatus according to claim 1, wherein the source and drain electrodes are separated by a separation space, and the active layer is disposed on the source electrode and the drain electrode and fills the separation space.

8. The display apparatus according to claim 1, wherein a third insulation layer with a first opening and a second opening spaced from the first opening is disposed on the active layer, and the source electrode and the drain electrode fill the first opening and the second opening, respectively.

9. The display apparatus according to claim 1, wherein the oxide semiconductor comprises a material selected from the group consisting of indium gallium zinc oxide (IGZO), indium tin zinc oxide (ITZO), indium gallium oxide (IGO), zinc oxide (ZnO), and tin oxide (SnO).

10. A display apparatus comprising a substrate, a plurality of first TFTs, a plurality of scan lines and data lines connected to the first TFTs, and a plurality of second TFTs for controlling inspection-use display signals, each of the second TFTs including:
    a first gate electrode disposed on the substrate;
    a first insulation layer disposed on the first gate electrode;
    an active unit disposed on the first insulation layer and having a source electrode electrically connected to one of the data lines and the scan lines, an active layer including an oxide semiconductor, and a drain electrode;
    a second insulation layer disposed on the active unit; and
    a second gate electrode disposed on the second insulation layer;
    wherein the first TFTs, the scan lines, and the data lines are disposed in a display area on the substrate, the second TFTs connected to the data lines are disposed in a first area on the substrate, the second TFTs connected to the scan lines are disposed in a second area on the substrate, and one of the display area, the first area, and the second area do not overlap the other one.

* * * * *